United States Patent
Kitajima et al.

[11] Patent Number: 5,904,788
[45] Date of Patent: May 18, 1999

[54] METHOD FOR CENTERING BELT-SHAPED MATERIAL

[75] Inventors: Toru Kitajima; Kiyoshi Sakayori; Naruhiro Akiyama, all of Tokyo, Japan

[73] Assignee: Bridgestone Corporation, Tokyo, Japan

[21] Appl. No.: 08/970,395

[22] Filed: Nov. 14, 1997

[30] Foreign Application Priority Data

Nov. 20, 1996 [JP] Japan .................................... 8-309414

[51] Int. Cl.$^6$ .................................................. B29D 30/30
[52] U.S. Cl. .......................... 156/64; 156/123; 156/133; 156/134; 156/406.4
[58] Field of Search ............................. 156/64, 133, 134, 156/123, 130, 110.1, 405.1, 406.4, 406.6, 394.1

[56] References Cited

U.S. PATENT DOCUMENTS

| | | | |
|---|---|---|---|
| 4,769,104 | 9/1988 | Okuyama et al. | 156/406.4 |
| 4,857,123 | 8/1989 | Still et al. | 156/133 |
| 5,167,751 | 12/1992 | Shimizu et al. | 156/394.1 |
| 5,206,720 | 4/1993 | Clothiaux et al. | 156/394.1 |
| 5,720,837 | 2/1998 | Regterschot et al. | 156/123 |

FOREIGN PATENT DOCUMENTS

7-195570  8/1995  Japan .

*Primary Examiner*—Geoffrey L. Knable
*Attorney, Agent, or Firm*—Sughrue, Mion, Zinn, Macpeak & Seas, PLLC

[57] ABSTRACT

The present invention is a method and apparatus for centering a belt-shaped material. A conveying direction leading end portion and a conveying direction trailing end portion of triangular portions of the belt-shaped material are displaced in advance in directions opposite directions in which the conveying direction leading end portion and the conveying direction trailing end portion of the belt-shaped material are displaced when applied onto a forming drum. Centering of a constant-width portion of the belt-shaped material is carried out as follows. A width of the constant-width portion of the belt-shaped material is measured while the belt-shaped material is conveyed. In accordance with the measured width, a distance between a pair of guide portions which are disposed so as to be movable in a widthwise direction of the belt-shaped material is adjusted. The belt-shaped material is passed through a space between the adjusted guide portions.

8 Claims, 9 Drawing Sheets

$$x = \frac{W}{\tan\theta}$$

SHAPE BEFORE APPLICATION

METHOD FOR CENTERING BELT-SHAPED MATERIAL

BACKGROUND OF THE INVENTION

1. Field of the Invention

The present invention relates to a method and apparatus for centering a belt-shaped material such as belt material for tires.

2. Description of the Related Art

In a process of manufacturing tires, a centering apparatus is used to center a belt material before the belt material is wound around a forming drum.

In such a centering apparatus, when a belt material, which has a constant width and is wound around a supply reel in a belt feed section, is fed out, the belt material is further conveyed by a cutting conveyer disposed at the downstream side of the supply reel, i.e., the side in the direction of feeding out the belt material. The conveying direction leading end of the belt material on the cutting conveyor is first cut obliquely by a cutter, and then the belt material is again cut obliquely by the cutter after being conveyed a predetermined distance. Thus, a piece of the belt material having a predetermined length is obtained.

The belt material cut to the predetermined length is fed out of the cutting conveyer, and is conveyed to an applying conveyer disposed at the conveying direction downstream side of the cutting conveyer. A forming drum which is rotatably supported is disposed at the downstream side of the applying conveyor. The belt material conveyed by the applying conveyer is wound onto the outer circumferential surface of the forming drum, which is rotating.

On the forming drum, the leading end and trailing end of the belt material must be joined together such that the cut surfaces of both ends coincide. Further, the widthwise center line of the constant-width portion of the belt member must coincide with the circumferential direction of the forming drum (i.e., the belt material must not meander).

In order to satisfy the above requirements, belt materials have conventionally been centered in accordance with, for example, (1) a method in which the belt material is centered through use of guides having a predetermined guide width without measurement of the overall width of the belt material, or (2) a method in which a cutting conveyer is moved in the widthwise direction of the belt material by a motor-driven mechanism in order to control the position at which the belt material is conveyed from the cutting conveyer to the applying conveyer such that the leading end, the trailing end, and the constant-width portion of the belt material are conveyed to respective predetermined positions (Japanese Patent Application Laid-Open No. 7-195570).

However, method (1), in which the overall width of the belt material is not measured, has the following drawbacks:

(a) When the width of the belt material is larger than the distance between the guides, widthwise end portions of the belt material ride onto the guides, resulting in improper centering of the belt material;

(b) When the width of the belt material is smaller than the distance between the guides, the belt material abuts none of the guides, resulting in improper centering of the belt material, and play is present between the guides and the belt member such that the belt material shifts to the right or left side in the widthwise direction; and (c) If the leading end and the trailing end of the belt material come out of position relative to each other at the joint portion such that a stepped portion is formed, such a problem cannot be handled.

Method (2) has the following drawbacks:

(d) Since the entire cutting conveyer is moved, the belt material is skewed when it is conveyed from the belt feed section to the cutting conveyer; and (e) Since the entire cutting conveyer, including the cutter apparatus, must be moved at high speed, a large amount of energy is required.

Moreover, due to cords disposed in the belt material such that they are inclined with respect to the longitudinal direction of the belt material, when the obliquely cut leading and trailing ends of the belt material ride onto the forming drum, the leading end and the trailing end may shift in the widthwise direction. No measures have been employed to cope with such a problem.

SUMMARY OF THE INVENTION

An object of the present invention is to provide a method and apparatus for centering a belt-shaped material that can solve the above-described drawbacks.

According to a first aspect of the invention, there is provided a method of centering a belt-shaped material in which a belt-shaped material, whose longitudinal ends are formed into triangular portions and which has a parallelogram shape as a whole, is conveyed in a longitudinal direction toward a forming drum while being centered, said method comprising the steps of: displacing a conveying direction leading end portion and a conveying direction trailing end portion of the triangular portions of the belt-shaped material in advance in directions opposite directions in which the conveying direction leading end portion and the conveying direction trailing end portion of the belt-shaped material are displaced when applied onto the forming drum; measuring a width of a constant-width portion of the belt-shaped material while the belt-shaped material is conveyed; adjusting, in accordance with the measured width, a distance between a pair of guide members which are disposed to be movable in a widthwise direction of the belt-shaped material; and centering the constant-width portion of the belt-shaped material by causing the belt-shaped material to pass through a space between the adjusted guide members.

According to the first aspect of the present invention, when the conveying direction leading end portion of the belt-shaped material, which has been displaced in advanced, is applied onto the forming drum, the leading end portion is displaced in a direction opposite the direction in which the leading end portion was displaced in advance. Therefore, the leading end portion of the belt-shaped material can be applied onto the forming drum in a proper shape.

When the constant-width portion of the belt-shaped material is wound around the forming drum, the belt-shaped material is conveyed toward the forming drum while the constant-width portion is centered by the width of the constant-width portion being measured, the distance between the pair of guide members which are disposed to be movable in the widthwise direction of the belt-shaped material being adjusted in accordance with the measured width, and the belt-shaped material being caused to pass through the space between the adjusted guide members. Therefore, the constant-width portion of the belt-shaped material can be wound around the forming drum such that the widthwise direction center line of the belt-shaped material is parallel to the circumferential direction of the forming drum.

Moreover, when the conveying direction trailing end portion of the belt-shaped material, which has been displaced in advanced, is applied onto the forming drum, the trailing end portion is displaced in a direction opposite the direction in which the trailing end portion was displaced in advance. Therefore, the trailing end portion of the belt-shaped material can be applied onto the forming drum in a proper shape. Thus, the leading end portion and the trailing end portion of the belt-shaped material can be joined together with no shifting (deviation of position) in the widthwise direction.

Accordingly, the method of centering a belt-shaped material according to the first aspect of the present invention enables the belt-shaped material to be reliably centered.

A second aspect of the present invention is a method of centering a belt-shaped material in which, in the method of the first aspect, the step of displacing the conveying direction leading end portion and the conveying direction trailing end portion of the belt-shaped material comprises the steps of: storing an angle of the conveying direction leading end portion of the belt-shaped material with respect to a conveying direction of the belt-shaped material, and an angle of the conveying direction trailing end portion of the belt-shaped material with respect to the conveying direction of said belt-shaped material, and amounts by which the conveying direction leading end portion and the conveying direction trailing end portion are respectively displaced in advance; successively measuring the widths of each triangular portion at different positions along the conveying direction; determining, on the basis of the measured widths and the stored angles, a distance between the conveying direction leading end portion of the belt-shaped material and the pair of guide members and a distance between the conveying direction trailing end portion of said belt-shaped material and the pair of guide members; and smoothly displacing each triangular portion in the widthwise direction, by a corresponding one of the guide members, on the basis of the stored displacement amount and in consideration of the distance determined for the triangular portion.

In accordance with the second aspect, there are first stored the angle of the leading end portion of the belt-shaped material with respect to the conveying direction of the belt-shaped material, the angle of the trailing end portion of the belt-shaped material with respect to the conveying direction of the belt-shaped material, and the respective amounts by which the leading end portion and the trailing end portion are displaced in advance.

Subsequently, the widths of the triangular portions along the conveying direction are successively measured. Based on the measured widths and the stored angles, the distance between the leading end portion of the belt-shaped material and the pair of guide portions and the distance between the trailing end portion of the belt-shaped material and the pair of guide portions are determined. The triangular portion is then displaced smoothly in the widthwise direction, by one of the guide members, on the basis of the stored displacement amount and in consideration of the distance determined for the triangular portion. Through this operation, the triangular portion is smoothly bent in the widthwise direction.

A third aspect of the present invention is a method of centering a belt-shaped material in which, in the method of the first aspect, the step of displacing the leading end portion and trailing end portion of the belt-shaped material comprises the steps of: storing displacement amounts by which the conveying direction leading end portion and the conveying direction trailing end portion are respectively displaced in advance; determining, on the basis of a predetermined conveying speed or an actual conveyed distance, a distance between the conveying direction leading end portion of the belt-shaped material and the pair of guide members and a distance between the conveying direction trailing end portion of the belt-shaped material and the pair of guide members; and smoothly displacing each of the triangular portions in the widthwise direction, by a corresponding one of the guide members, on the basis of the stored displacement amount and in consideration of the distance determined for the triangular portion.

In accordance with the third aspect, first, the amounts by which the leading end portion and the trailing end portion are respectively displaced in advance are stored.

Subsequently, the distance between the leading end portion of the belt-shaped material and the pair of guide portions and the distance between the trailing end portion of the belt-shaped material and the pair of guide portions are determined on the basis of the predetermined conveying speed or the actual conveyed distance. Each of the triangular portions is then displaced smoothly in the widthwise direction, by the corresponding guide member, on the basis of the stored displacement amount and in consideration of the distance determined for the triangular portion. Through this operation, the triangular portions are smoothly bent in the widthwise direction.

According to a fourth aspect of the present invention, there is provided an apparatus for centering a belt-shaped material, the apparatus comprising: first conveying means for conveying a belt-shaped material fed out of a belt feed section; a cutter for cutting the belt-shaped material at a predetermined angle with respect to a longitudinal direction of the belt-shaped material; second conveying means, disposed at a belt-shaped material conveying direction downstream side of said first conveying means, for conveying the belt-shaped material fed from said first conveying means toward a forming drum; detection means, disposed at a belt-shaped material conveying direction downstream side of said cutter for detecting positions of widthwise direction end portions of the belt-shaped material; and guide means including a pair of guide members which are disposed to face the widthwise direction end portions of the belt-shaped material conveyed by said second conveying means, and moving means for moving said pair of guide members such that the guide members approach each other or move apart from each other said guide means centering the belt-shaped material by causing the guide members to displace in advance a conveying direction leading end portion and a conveying direction trailing end portion of triangular portions provided at longitudinal direction ends of the belt-shaped material, in directions opposite directions in which the conveying direction leading end portion and the conveying direction trailing end portion of the belt-shaped material are displaced when applied onto the forming drum, and by calculating a width of said belt-shaped material on the basis of positions of the widthwise direction end portions of the belt-shaped material detected by said detection means, and by adjusting a distance between the guide members in accordance with the calculated width, and by causing the belt-shaped material to pass through a space between the adjusted guide portions.

According to the fourth aspect of the present invention, the belt-shaped material fed out of the belt feed section is first conveyed by the first conveying means.

The belt-shaped material on the first conveying means is cut by the cutter. Thus, there is obtained a piece of the belt-shaped material which has a predetermined length and whose conveying direction leading end portion and conveying direction trailing end portion have been cut obliquely at a predetermined angle with respect to the longitudinal direction.

The belt-shaped material cut to the predetermined length is then conveyed to the second conveying means by the first conveying means.

The widthwise direction position of the belt-shaped material having the predetermined length and conveyed by the second conveying means is detected by the detection means.

The guide means causes the guide members to displace the leading end portion of the leading-end-side triangular portion of the belt-shaped material in advance in a direction opposite the direction in which the leading end portion is displaced when applied onto the forming drum.

Subsequently, the guide means calculates the width of the belt-shaped material from the positions of the widthwise direction end portions of the belt-shaped material detected by the detection means, adjusts the distance between the guide portions in accordance with the calculated width, and causes the belt-shaped material to pass through the space between the adjusted guide members, so as to center the constant-width portion of the belt-shaped material.

Next, the guide means causes the guide members to displace the trailing end portion of the trailing-end-side triangular portion (i.e., the conveying direction upstream side triangular portion) of the belt-shaped material in advance in a direction opposite the direction in which the trailing end portion is displaced when applied onto the forming drum.

In this way, when the leading end of the belt-shaped material, whose leading and trailing end portions have been displaced in advanced and whose constant-width portion has been centered, is applied onto the forming drum, first, the leading end portion shifts in a direction opposite the direction in which the leading end portion was displaced in advance. Therefore, the leading end portion of the belt-shaped material can be applied onto the forming drum in a proper shape.

Since the constant-width portion of the belt-shaped material has been centered, the constant-width portion can be wound around the forming drum such that the centerline of the constant-width portion is parallel to the circumferential direction of the forming drum.

Further, when the trailing end portion which has been displaced in advance is applied onto the forming drum, the trailing end portion is displaced in a direction opposite the direction in which the trailing end portion was displaced in advance. Therefore, the trailing end portion of the belt-shaped material can be applied onto the forming drum in a proper shape. Thus, the leading end portion and the trailing end portion of the belt-shaped material can be joined together with no deviation in the widthwise direction.

Since the distance between the guide members can be adjusted while the overall width of the belt-shaped material (the distance calculated from the positions of the right and left widthwise direction ends) is continuously measured, centering of the belt-shaped member is possible even when the width of the belt-shaped material varies.

Further, since centering of the belt-shaped member and other operations are performed by only moving the guide portions, there is no need for a large amount of energy as there is in a case in which an entire conveyer is moved.

Moreover, since the belt-shaped material on the second conveying means is centered due to movement of the guide members, the belt-shaped material is not skewed when conveyed from the belt feed section to the first conveying means.

Therefore, the apparatus according to the forth aspect of the present invention enables the belt-shaped material to be reliably centered with a minimum amount of energy.

DESCRIPTION OF THE PREFERRED EMBODIMENT

A centering apparatus according to an embodiment of the present invention will now be described with reference to FIGS. 1 to 13B.

Figure 1:
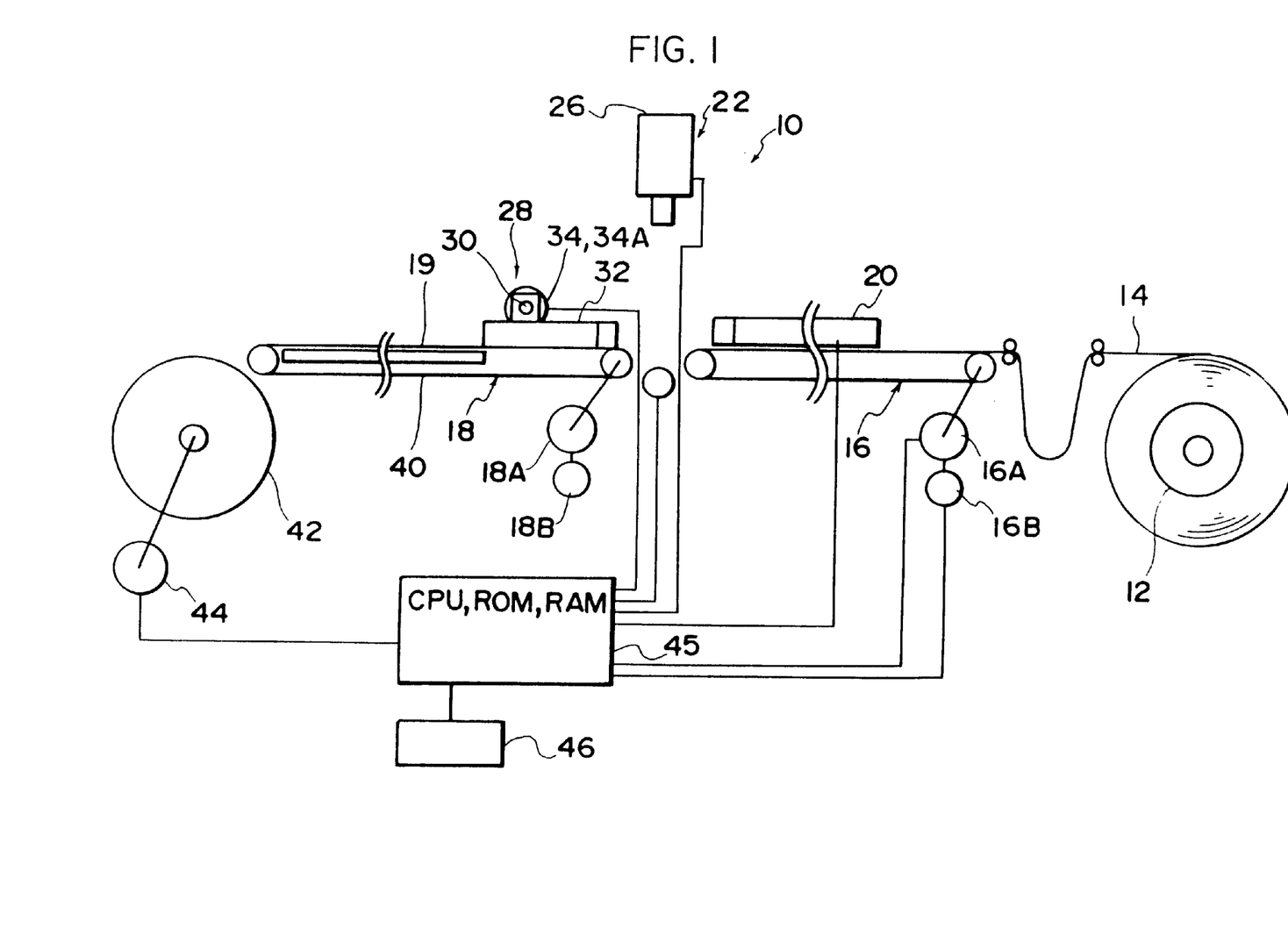
FIG. 1 is a side view of a centering apparatus according to an embodiment of the present invention.

As shown in FIG. 1, a centering apparatus 10 according to the present embodiment is equipped with a first conveyer 16 and a second conveyer 18, which pull out and convey a belt material (belt-shaped material) 14 which is wound around a supply reel 12 serving as a belt feed section.

The first conveyer 16 is driven by a motor 16A, while the second conveyer 18 is driven by a motor 18A.

A rotary encoder 16B is connected to the motor 16A or to one of unillustrated belt material drive rollers of the first conveyer 16, and a rotary encoder 18B is connected to the motor 18A or to one of unillustrated belt material drive rollers of the second conveyer 18. Therefore, the conveying speed can be controlled, and the amount of conveying of the belt material 14 can be judged from the rotational amounts.

Unillustrated steel cords are embedded in the belt material 14 such that the steel cords are inclined with respect to the longitudinal direction of the belt material 14.

Figure 2:
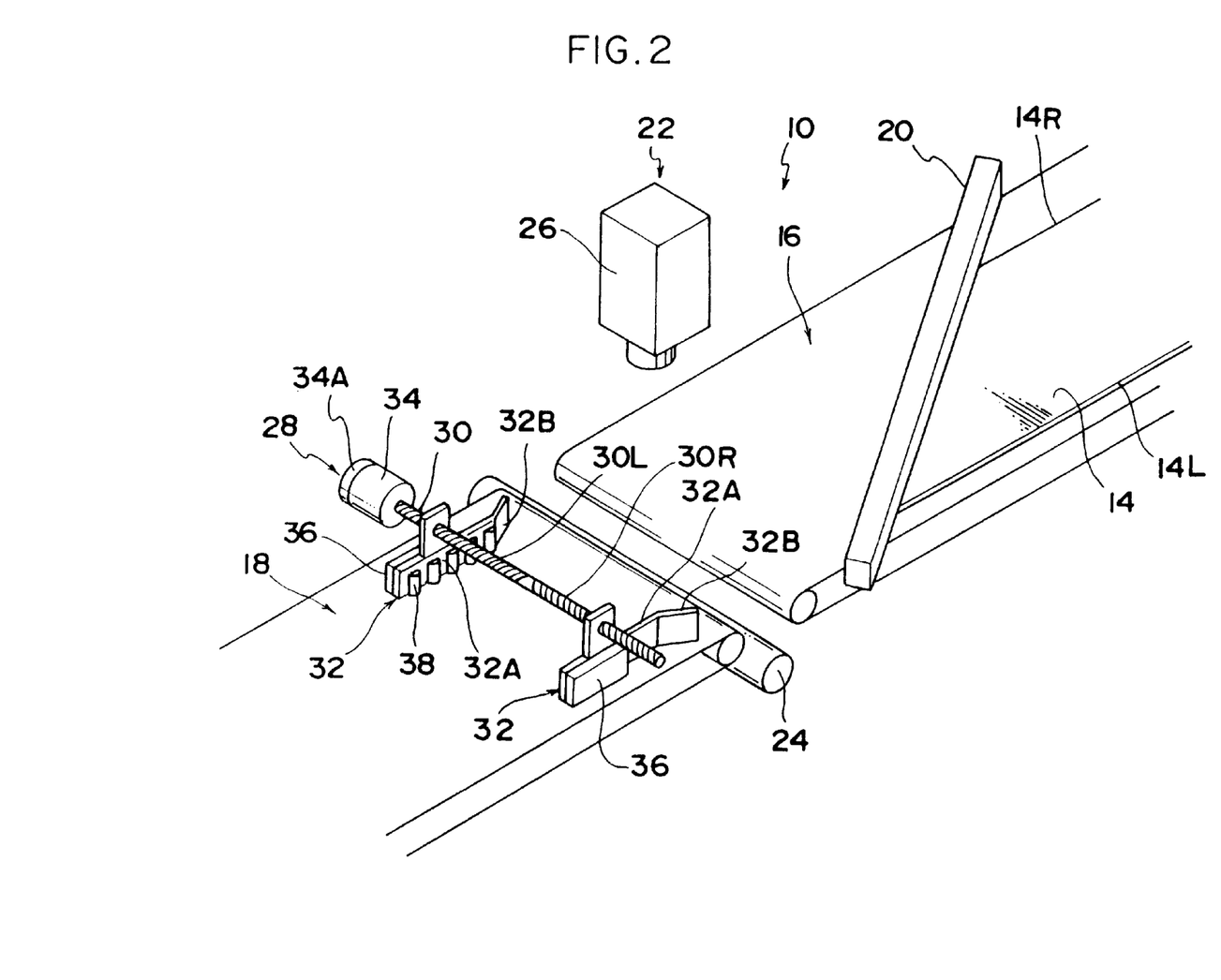
FIG. 2 is a perspective view of a main portion of the centering apparatus.

As shown in FIGS. 1 and 2, a cutter 20 is disposed above the first conveyer 16 in order to cut the belt material 14 on the first conveyer 16 at a predetermined angle θ with respect to the longitudinal direction of the belt material 14.

A sensing unit 22 serving as a detection means is disposed between the first conveyer 16 and the second conveyer 18.

The sensing unit 22 includes a light emitting source 24 disposed under the conveying path of the belt material 14 and a camera 26 disposed above the conveying path of the belt material 14. The light emitting source 24 is, for example, a fluorescent lamp that is long in the widthwise direction of the belt material 14. Through use of the camera 26, the sensing unit 22 photographs the belt material 14 conveyed above the light emitting source 24 in order to detect the widthwise direction positions of the edges (i.e., outline) of the belt material 14.

Since only the widthwise direction positions of the widthwise direction edges of the belt material 14 need be detected, an image sensor such as a CCD may be used in place of the camera 26.

A centering guide mechanism 28 is disposed above the second conveyer 18 at the conveying direction upstream side thereof.

The centering guide mechanism 28 includes a feed screw 30 which is disposed perpendicularly to the conveying direction. The feed screw 30 is rotated by an AC servomotor 34 connected to one end of the feed screw 30. The feed screw 30 has a left-hand thread 30L formed from the longitudinal center portion toward the AC servomotor 34 and a right-hand thread 30R formed from the longitudinal center portion toward the distal end of the feed screw 30. Unillustrated female thread portions of guides 32 are screw-engaged with the left-hand thread 30L and the right-hand thread 30R. Accordingly, by rotating the feed screw 30, the distance T between the guides 32 can be changed. The pitch of the left-hand thread 30L and the pitch of the right-hand thread 3OR are identical to each other.

Therefore, when the center point between the guides 32 is regarded as the center of centering, the distance between the center and one guide 32 and the distance between the center and the other guide 32 are always the same regardless of the distance between the guides 32.

The distance between the guides 32 corresponds to the rotational amount of the feed screw 30 (the rotational amount (rotational angle) of the rotary shaft of the AC servomotor 34). A rotary encoder 34A is connected to the AC servomotor 34. Therefore, the distance between the guides 32 can be set to a desired dimension through control of the rotational angle of the rotary shaft of the AC servomotor 34.

Each of the guides 32 has a flat guide portion 32A that extends in the conveying direction and a slanted guide portion 32B provided at the conveying direction upstream side of the flat guide portion 32A.

A magnet 36 is mounted to the back surface of the flat guide portion 32A in order to exert a magnetic force on the steel cords of the belt material 14, thereby attracting the corresponding widthwise direction end portion of the belt material 14. As shown in FIG. 2, a plurality of small-diameter rollers 38 are rotatably mounted to the flat guide portion 32A such that the small-diameter rollers 38 are perpendicular to the conveying surface of the second conveyer 18. Due to the small-diameter rollers 38 rotating while contacting the widthwise direction end portions of the belt material 14 which is being conveyed, the small-diameter rollers 38 can guide the belt material 14 smoothly while the magnets 36 attract the belt material 14.

Further, a magnet 40 is disposed in the vicinity of the reverse surface of the straight portion (i.e., flat portion) of the conveyer belt 19 of the second conveyer 18, at the conveying direction downstream side of the centering guide mechanism 28. Since the steel cords of the belt material 14 are attracted by the magnetic force of this magnet 40, the belt material 14 is attracted to and fixed to the conveyer belt 19 so that the shape of the belt material 14 is maintained.

A forming drum 42 which is rotated by a motor 44 is disposed at the conveying direction downstream side of the second conveyer 18. The belt material 14 is wound around the outer circumferential surface of the forming drum 42.

The above-described motors 16A and 18A, rotary encoders 16B and 18B, cutter 20, sensing unit 22, AC servomotor 34, rotary encoder 34A, and motor 44 are connected to a controller 45. The controller 45 includes a CPU, a storage unit (ROM, RAM), and the like. A setting/operation panel 46 is connected to the controller 45 in order to carry out various types of setting.

Control programs and the like for the centering apparatus are stored in the storage unit.

Next, the operation of the centering apparatus according to the present embodiment will be described.

Figure 3:
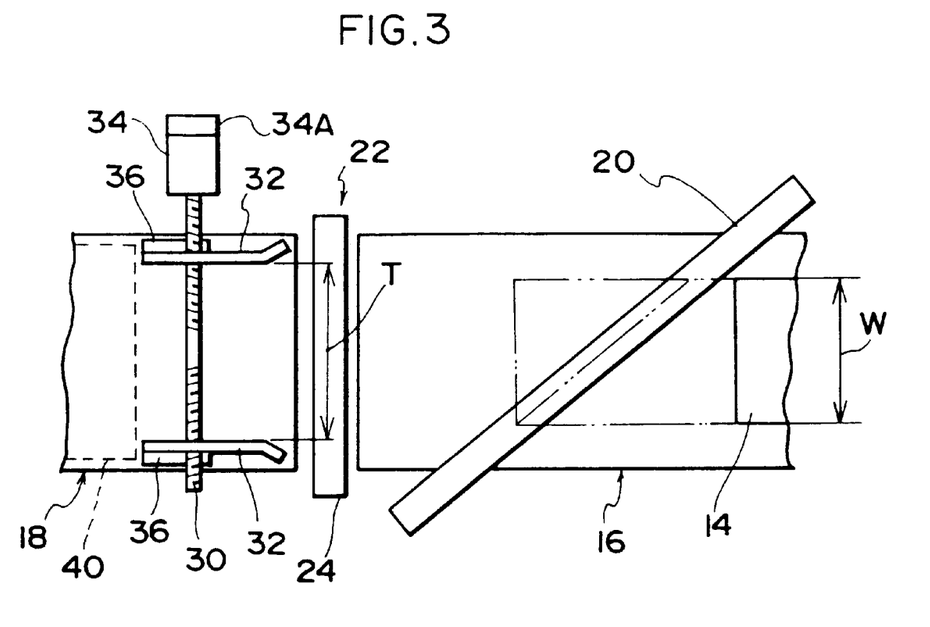
FIG. 3 is a plan view of the centering apparatus, showing a state before the leading end of a belt material has been cut.

(1) First, as shown in FIG. 3, the guides 32 are set to their respective origin positions. (In FIGS. 3 to 11, the smaller-diameter rollers 38 are omitted.)

At this time, the distance T between the guides 32 is set to be larger than the width W of the belt material 14 to be conveyed. The belt material 14 of the supply reel 12 is conveyed by the first conveyer 16 and is then temporarily stopped. In this state, the leading end of the belt material 14, which leading end is at the conveying direction downstream side, is cut by the cutter 20 at a predetermined angle θ so that a triangular portion is formed. The unnecessary portion cut from the leading end of the belt material 14 is discarded. After the above-described cutting operation, the triangular portion of the belt material 14 whose leading end has been cut is applied to the forming drum 42, as a preceding belt material 14.

Figure 4:
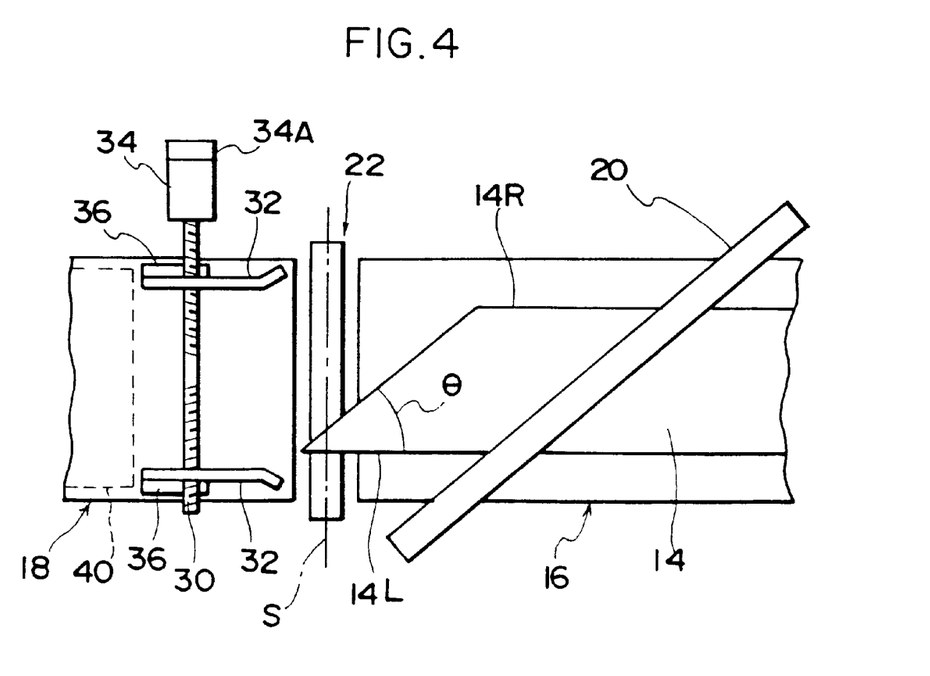
FIG. 4 is a plan view of the centering apparatus, showing a state in which the belt material has been conveyed after its leading end has been cut.

(2) The first conveyer 16 and the second conveyer 18 are operated, so that, as shown in FIG. 4, the belt material 14 is conveyed to the second conveyer 18 at a low speed. When the belt material 14 has been conveyed from the first conveyer 16, the positions of the edges of the belt material 14 are continuously sensed by the sensing unit 22 at a position of a sensing line S.

Based on edge detection information from the sensing unit 22, the controller 45 calculates the conveying speed of the belt material 14 and the point in time when the leading end of the belt material 14 will reach the guides 32.

Figure 5:
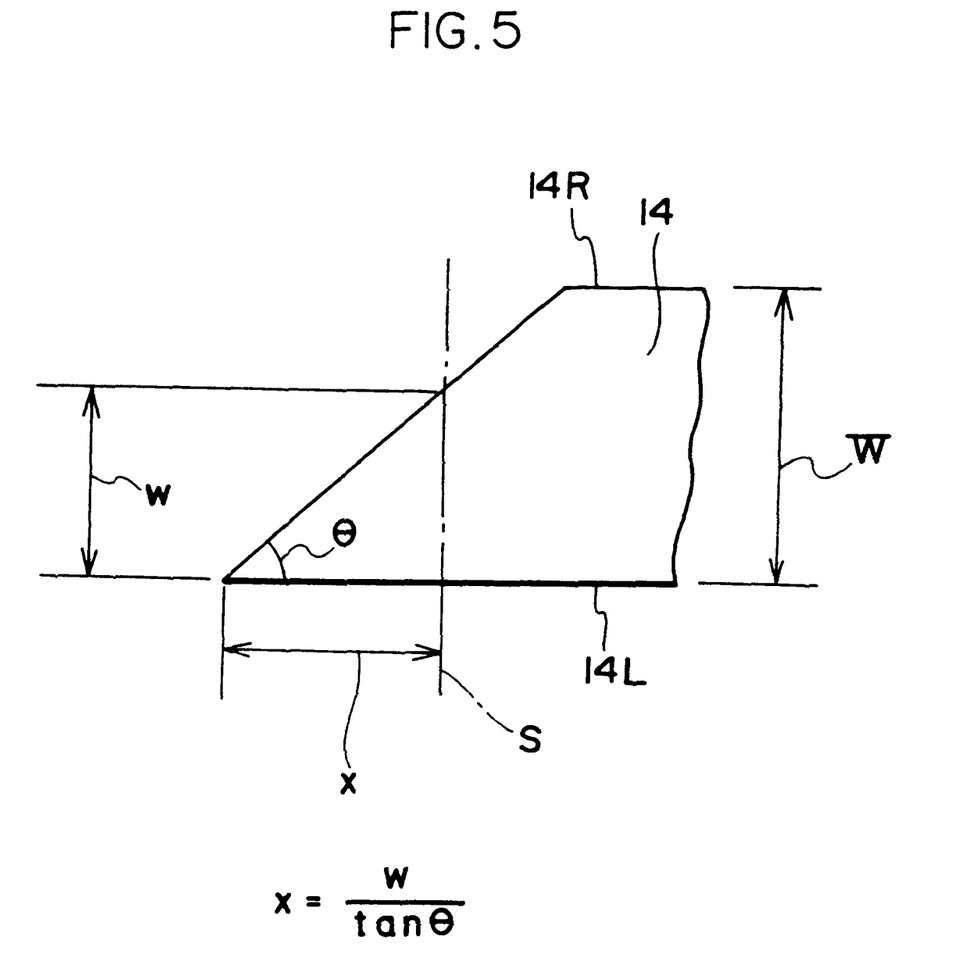
FIG. 5 is a plan view of a triangular portion of the belt material.

Since the cut angle θ of the belt material 14 at the leading end thereof is known in advance (is stored in the storage unit of the controller 45), if the width W of the belt material 14 is measured by the sensing unit 22 at the measurement line S, as shown in FIG. 5, the distance X between the measurement line S and the leading end of the belt material 14 can be calculated, and the present position of the leading end of the belt material 14 can be determined thereby.

The present position or actual conveyed distance of the belt material 14 may be determined on the basis of the output signals (e.g., numbers of pulses) from the encoders 16B and 18B. Alternatively, the present position of the belt material 14 may be determined on the basis of the moving speeds of the first conveyor 14 and the second conveyer 18. Accordingly, the conveying distance until the leading end of the belt material 14 reaches the guides 32 is determined on the basis of the conveying speed of the belt material 14 and the time when the leading end of the belt material 14 reaches the guides 32, or on the basis of the present position of the belt material 14 and the moving speeds of the first conveyor 16 and the second conveyer 18.

(3) Before the leading end of the belt material 14 reaches the guides 32, the guides 32 are controlled by the controller 45. The flat guide portions 32A of the guides 32 are moved such that each flat guide portion 32A is slightly closer to the center of the belt material 14 than is the widthwise direction end portion 14L which forms the leading-end-side triangular portion of the belt material 14.

Figure 6:
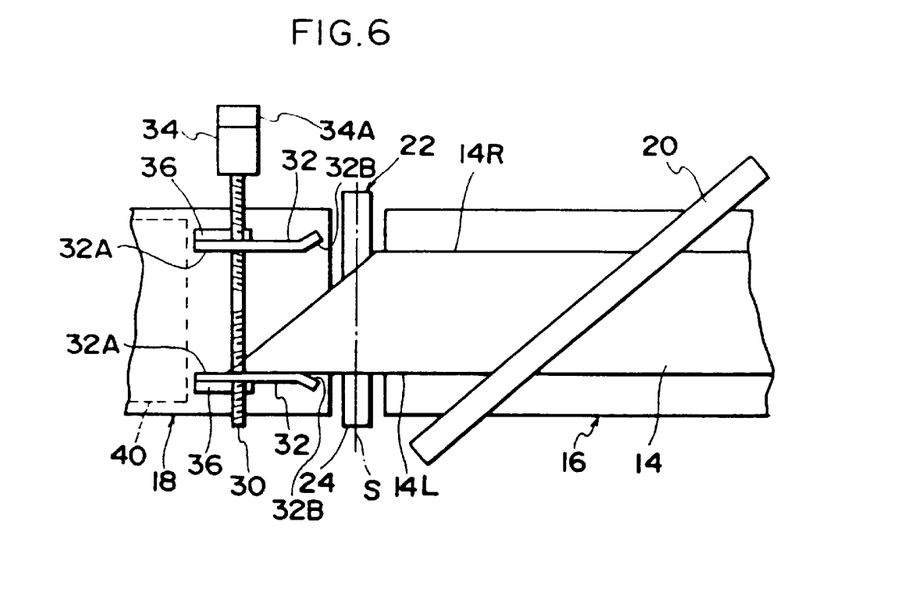
FIG. 6 is a plan view of the centering apparatus, showing a state in which the leading end of the belt material has entered into a space between guides.

(4) When the leading end of the belt material 14 enters the space between the guides 32, the leading end first passes by the slanted guide portion 32B, and then the widthwise direction end portion 14L is guided by the flat guide portion 32A as illustrated in FIG. 6. Further when the widthwise direction end portion 14L reaches the position at which the magnet 36 is mounted, the leading end of the widthwise direction end portion 14L is attracted by the magnet 36.

Figure 7:
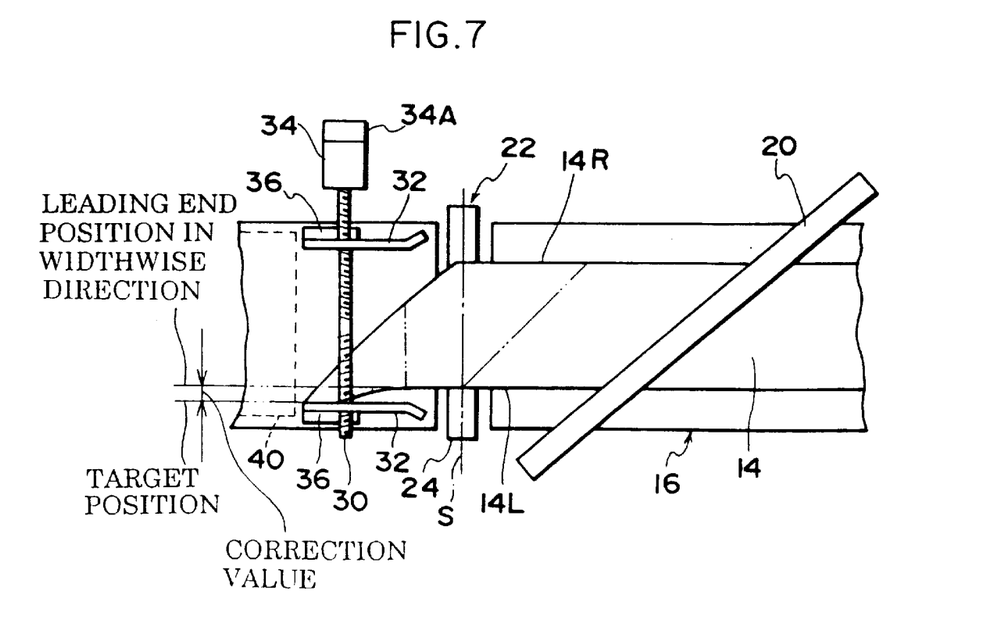
FIG. 7 is a plan view of the centering apparatus, showing a state in which the leading end of the belt material has been attracted by a magnet of a guide.

(5) The controller 45 calculates a value of a target position by adding a previously stored correction amount to the value of the position of the leading end of the widthwise direction end portion 14L of the belt material 14, which position has been measured by the sensing unit 22 at the measurement line S. Subsequently, the controller 45 increases the distance between the guides 32 such that, as shown in FIG. 7, the leading end reaches the target position whose value was calculated. It is to be noted that the movement of the guides 32 is completed before the leading end has passed through the guides 32.

Figure 8:
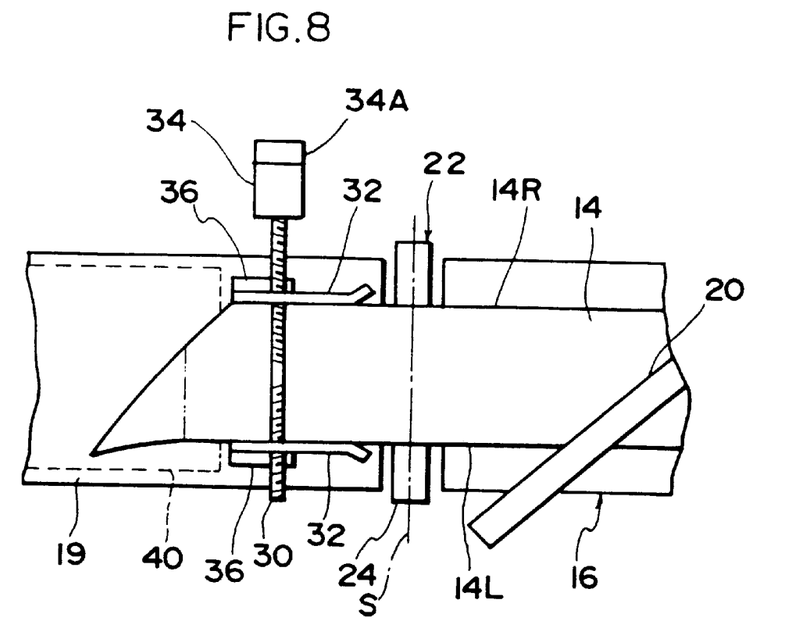
FIG. 8 is a plan view of the centering apparatus, showing a state in which outward bending of the leading-end-side triangular portion of the belt material is completed.

(6) Next, while the distance between the guides 32 is being decreased gradually, the operation for bending the leading-end-side triangular portion of the belt material 14 outwardly in the widthwise direction is carried out until the triangular portion is, at the end portion thereof which is positioned downstream of the guides 32, bent up to an intermediate point of the triangular portion (i.e., up to the position indicated by the two-dot chain line in FIG. 8). Subsequently, the leading end of the belt material 14 that has passed through the space between the guides 32 is attracted to the conveyer belt 19 by the magnetic force of the magnet 40 so that the outwardly bent shape is maintained.

In consideration of the relationship between the conveying speed and the correction amount, in the present embodiment, the guides 32 are controlled to move at intervals of 1 to 5 milliseconds. However, the guides 32 may be moved continuously.

Subsequently, the longitudinally intermediate portion (constant-width portion) of the belt material 14 is centered. In the centering of the constant-width portion of the belt material 14, the distance between the guides 32 is adjusted in accordance with the width of the belt material 14 measured by the sensing unit 22, and both widthwise direction ends of the belt material 14 are guided by the guides 32. Namely, the belt material 14 is centeredly passing through the space between the guides 32. The centered belt material 14 is attracted and held to the conveyer belt 19 by the magnetic force of the magnet 40.

(7) When the belt material 14 has been conveyed a predetermined distance, the first conveyer 16, the second conveyer 18, and the guides 32 are stopped, and the cutter 20 is operated to cut the belt material 14. As a result, a piece of the belt material 14 having a predetermined length is obtained.

Figure 9:
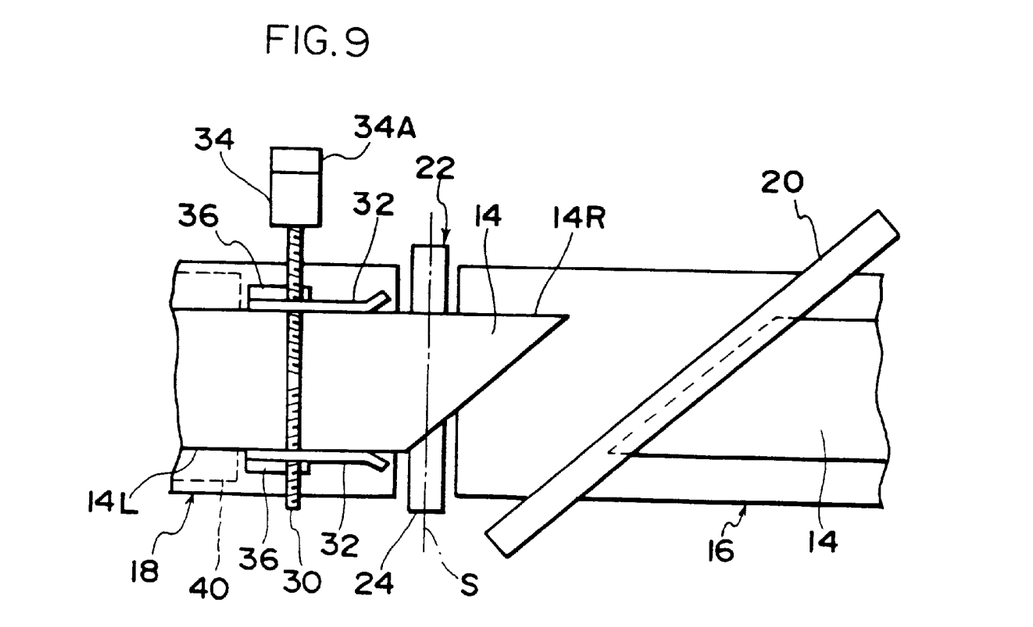
FIG. 9 is a plan view of the centering apparatus, showing a state in which the constant-width portion of the belt material is subjected to centering.

(8) After the cutting operation, the first conveyer 16 and the guides 32 are operated, so that, as shown in FIG. 9, the belt material 14 cut to the desired length is further conveyed while being centered by the guides 32.

Figure 10:
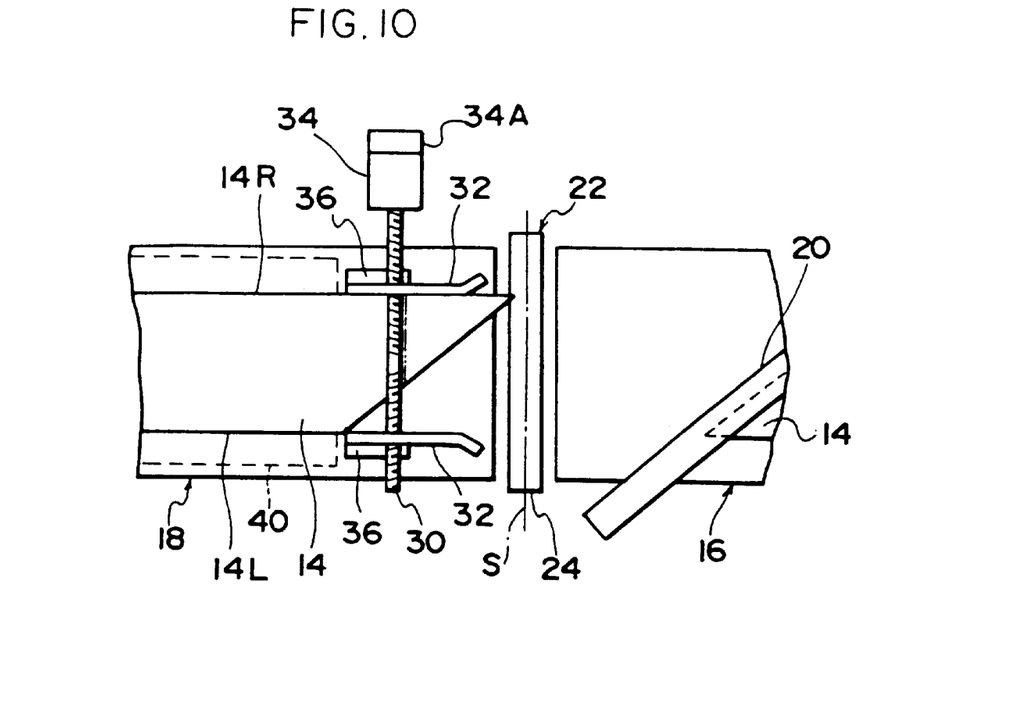
FIG. 10 is a plan view of the centering apparatus, showing a state in which outward bending of the trailing-end-side triangular portion of the belt material is started.
Figure 11:
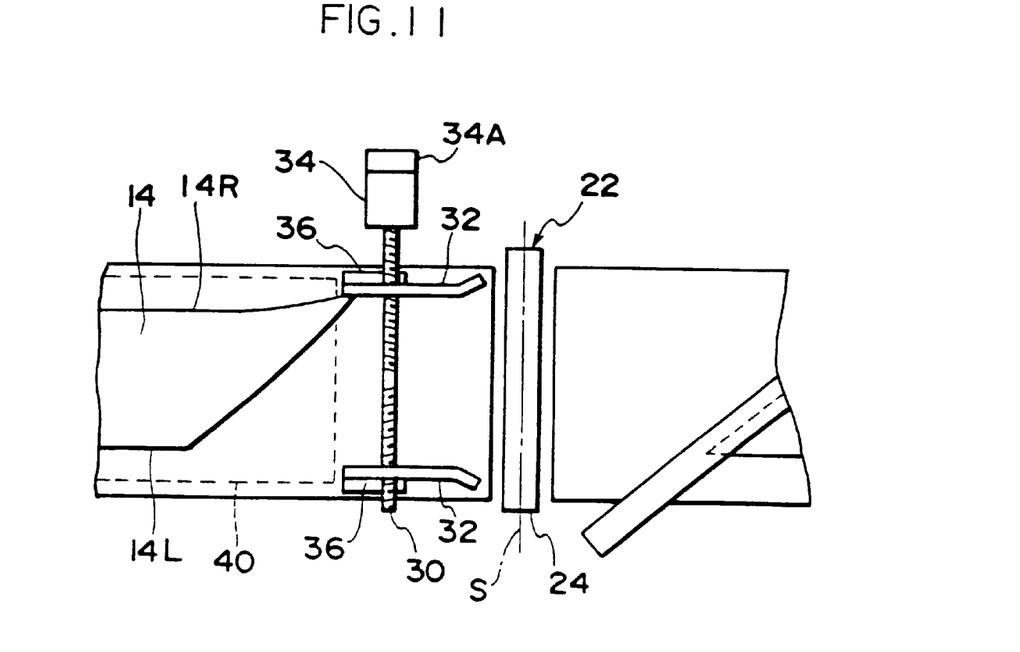
FIG. 11 is a plan view of the centering apparatus, showing a state immediately before the outward bending of the trailing-end-side triangular portion of the belt material is completed.

(9) When the belt material 14 is further conveyed and the positions of the edges of the trailing-end-side triangular portion are sensed by the sensing unit 22, the controller 45 calculates the value of a target position by adding a previously stored correction amount to the actual value of the widthwise position (averaged position) of the widthwise direction end portion 14R of the belt material 14 which has already passed through the measurement line S. When a front side (the portion indicated by the two-dot chain line in FIG. 10) of the trailing-end-side triangular portion reaches the belt material 14 conveying direction downstream end portion of the guide 32 as illustrated in FIG. 10, the operation for increasing the distance between the guides 32 is started, and, as shown in FIG. 11, the distance between the guides 32 is gradually increased such that the conveying direction upstream side end reaches the target position.

Since the widthwise direction end portion 14R is attracted by the guide 32, the trailing-end-side triangular portion is bent outward in the widthwise direction due to the gradual increase in the distance between the guides 32. The portion of the belt material 14 that has passed through the space between the guides 32 is attracted to the conveyer belt 19 by the magnetic force of the magnet 40, so that the outwardly bent shape is maintained.

Figure 12A:
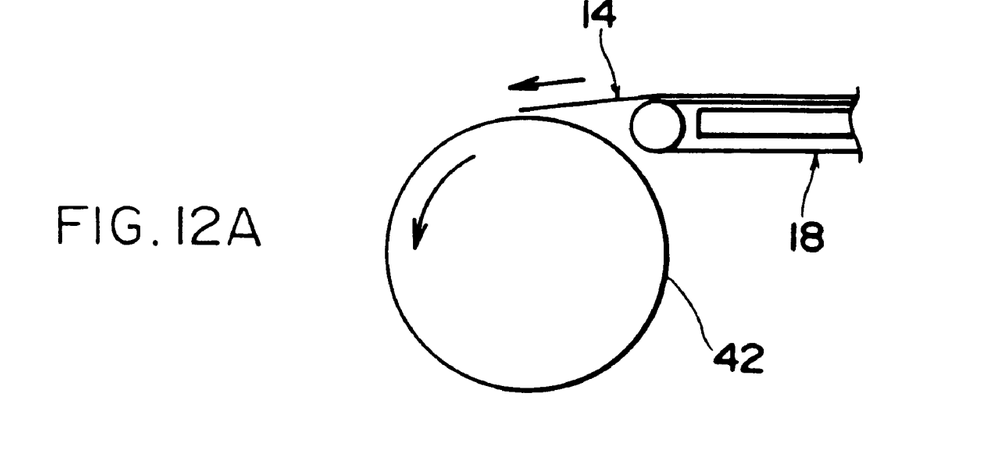
FIG. 12A is a side view of a forming drum and the vicinity thereof, showing a state in which the leading end of the belt material has abutted the outer circumferential surface of the forming drum.
Figure 12B:
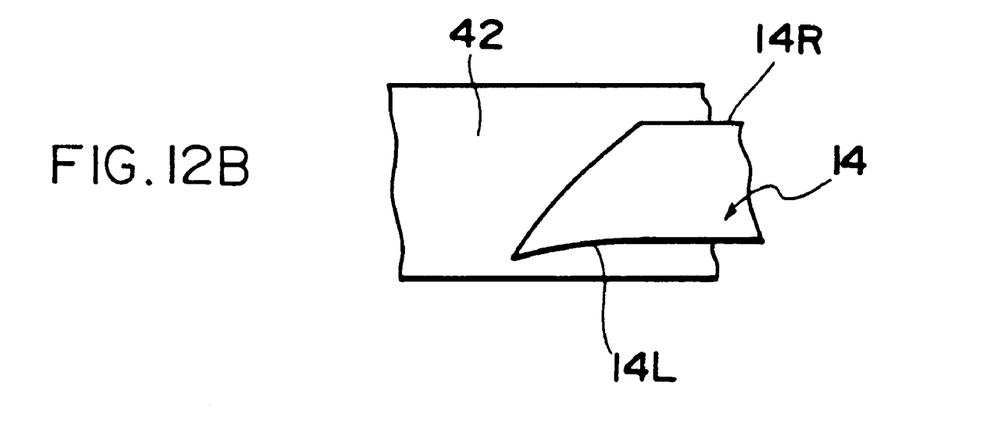
FIG. 12B is a development showing the outer circumferential surface of the forming drum of FIG. 12A.

(10) Subsequently, the leading end of the belt material 14 abuts the outer circumferential surface of the forming drum 42 which is rotated at a speed corresponding to the conveying speed of the belt material 14 (see FIGS. 12A and 12B). When the leading-end-side triangular portion of the belt material 14 starts to be wound around the outer circumferential surface of the forming drum 42, due to the action of the inclined steel cords, the triangular portion, whose rigidity is lower than that of the constant-width portion, starts to bend inward. At the point in time when the triangular portion is completely wound, the widthwise direction edge portion 14L of the triangular portion becomes parallel to the circumferential direction of the forming drum 42 (see FIGS. 13A and 13B; the circumferential direction is indicated by arrow A).

Figure 13A:
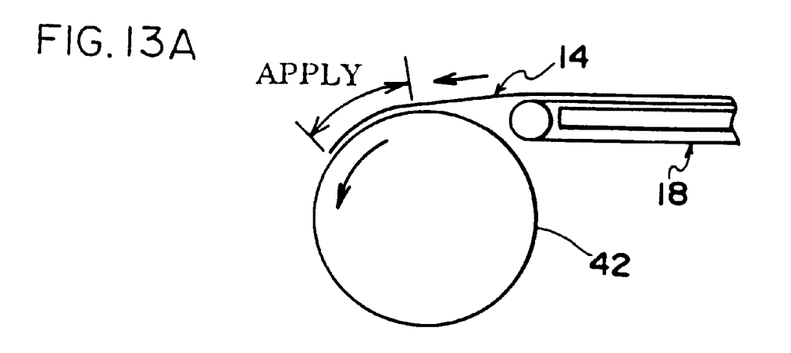
FIG. 13A is a side view of the forming drum and the vicinity thereof, showing a state in which the leading-end-side triangular portion of the belt material has been applied onto the outer circumferential surface of the forming drum.
Figure 13B:
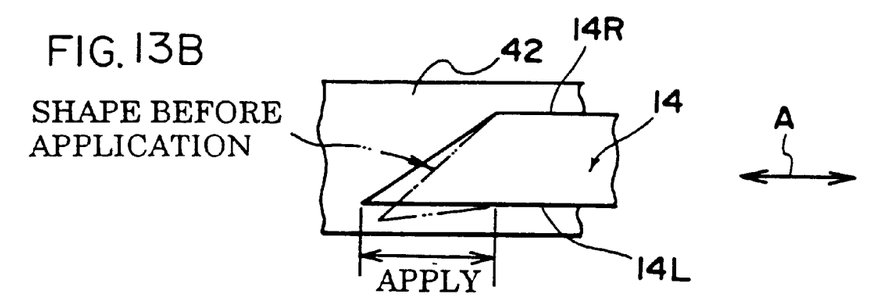
FIG. 13B is a development showing the outer circumferential surface of the forming drum of FIG. 13A.

Subsequently, the constant-width portion of the belt material 14 is wound around the outer circumferential surface of the forming drum 42.

When the trailing-end-side triangular portion of the belt material 14 starts to be wound around the outer circumferential surface of the forming drum 42, the trailing-end-side triangular portion starts to bend inward. At the point in time when the triangular portion is completely wound, the widthwise direction edge portion 14L of the trailing-end-side triangular portion becomes parallel to the circumferential direction of the forming drum 42. As a result, the widthwise direction edge portion 14L of the trailing-end-side triangular portion coincides with the widthwise direction edge portion 14L of the leading-end-side triangular portion which has been wound. The oblique side of the leading-end-side triangular portion and the oblique side of the trailing-end-side triangular portion are made to overlap each other over a predetermined distance and are joined together.

As described above, in the present embodiment, by bending the end portions of the belt material 14 such that the end portions tend to bend in directions opposite directions in which the end portions shift while the belt material 14 being applied to the forming drum 42, no stepped portion is formed on the outer circumference of the forming drum. Accordingly, opposite ends of the belt material 14 can be joined together on the outer circumferential surface of the forming drum 42 without a stepped portion being formed. The constant-width portion of the belt material 14 becomes parallel to the circumferential direction of the forming drum 42 (the widthwise direction center line does not meander).

Use of the centering apparatus 10 of the present embodiment obviates the need for manual correction performed by an operator after the belt material 14 is applied onto the forming drum 42. Accordingly, the present invention provides excellent effects for automation.

The correction amount of the conveying direction leading end and the correction amount of the conveying direction trailing end may be previously stored separately. Further, an operator may cause a sample belt material for adjustment to be conveyed, make corrections while observing the stepped portion at the joint portion, and stores the proper correction amounts into the storage unit from the setting/operation panel 46.

Since centering of the belt material 14 is performed through movement of the guides 32 which are very light as compared to the first conveyer 16 and the second conveyers 18, a minimal amount of energy is needed.

A belt material for radial tires was actually conveyed by the centering apparatus having the above-described structure. The test results show that the deviation from the center was not greater than 1.0 mm, the amount of meandering of the belt material was not greater than 2.0 mm, and the stepped portion was not greater that 2.0 mm. In the centering apparatus used in the test, the centering range was ±25 mm (widthwise direction), the maximum centering speed was 12 mm/sec, the conveyer speed was 20 to 200 mm/sec, and the bending range for the leading and trailing ends of the belt material was ±20 mm.

In the above-described embodiment, when the leading-end-side triangular portion is bent outward in the widthwise direction, a target position is obtained by adding a previously stored correction amount to the widthwise direction position of the leading end of the belt material 14 measured by the sensing unit 22 at the measurement line S. However, instead of the widthwise direction position of the leading end of the belt material 14 measured at the measurement line S, a process reference value (reference position) previously determined for the apparatus may be used. Alternatively, the actual position (average value) of the leading end of a previously conveyed belt material 14 may be used.

Further, in the case in which the constant-width portion of the belt material 14 that will enter the space between the guides 32 greatly deviates in the widthwise direction, a part of the constant-width portion close to the leading end is preferably moved substantially toward the center by causing the leading-end-side widthwise direction side surface to be attracted by the corresponding guide 32, and then moving the guides 32 in a direction opposite to the direction of the deviation.

The above-described embodiment shows an example in which the leading and trailing ends of the belt material 14 bend inward due to their inherent tendencies when the leading and trailing ends are applied onto the forming drum 42. However, in a case in which the leading and trailing ends of the belt material 14 bend outward due to their inherent tendencies, the leading and trailing ends of the belt material 14 may be bent inward in advance through use of the guides 32.

The present application can be applied to centering of materials other than the above-described belt material insofar as the materials have a belt-like shape.

What is claimed is:

1. In a method of centering a belt-shaped material in which a belt-shaped material, whose longitudinal ends are formed into triangular portions and which has a parallelogram shape as a whole, is conveyed in a longitudinal direction to a forming drum while being centered, the improvement comprising the steps of:

displacing a conveying direction leading end portion and a conveying direction trailing end portion of the triangular portions of the belt-shaped material in advance in directions opposite directions in which the conveying direction leading end portion and the conveying direction trailing end portion of the belt-shaped material are displaced when applied on to the forming drum whereby the leading and trailing end portions will be joined together on the forming drum to coincide in the widthwise direction;

measuring a width of a constant-width portion of the belt-shaped material while the belt-shaped material is conveyed;

adjusting, in accordance with the measured width, a distance between a pair of guide members which are disposed to be movable in a widthwise direction of the belt-shaped material; and centering the constant-width portion of the belt-shaped material by causing the belt-shaped material to pass through a space between the adjusted guide members.

2. A method of centering a belt-shaped material according to claim 1, wherein said step of displacing the conveying direction leading end portion and the conveying direction trailing end portion of the belt-shaped material comprises the steps of:

storing an angle of the conveying direction leading end portion of the belt-shaped material with respect to a conveying direction of the belt-shaped material, and an angle of the conveying direction trailing end portion of the belt-shaped material with respect to the conveying direction of said belt-shaped material, and amounts by which the conveying direction leading end portion and the conveying direction trailing end portion are respectively displaced in advance;

successively measuring the widths of each triangular portion at different positions along the conveying direction;

determining, on the basis of the measured widths and the stored angles, a distance between the conveying direction leading end portion of the belt-shaped material and the pair of guide members and a distance between the conveying direction trailing end portion of said belt-shaped material and the pair of guide members; and smoothly displacing each triangular portion in the widthwise direction, by a corresponding one of the guide members, on the basis of the stored displacement amount and in consideration of the distance determined for the triangular portion.

3. A method of centering a belt-shaped material according to claim 2, wherein said step of displacement of each of the conveying direction leading end portion and the conveying direction trailing end portion of the belt material is caused by a magnetic attraction force of the corresponding one of the guide members.

4. A method of centering a belt-shaped material according to claim 3, wherein said step of displacement of each of the conveying direction leading end portion and the conveying direction trailing end portion of the belt material is caused by attraction of a widthwise direction end portion of each of the conveying direction leading end portion and the conveying direction trailing end portion to the corresponding one of the guide members and subsequent movement of the corresponding one of the guide members over a predetermined distance.

5. A method of centering a belt-shaped material according to claim 2, wherein said step of measurement of the width is performed by detection of the positions of widthwise direction end portions of the belt-shaped material by a detection means.

6. A method of centering a belt-shaped material according to claim 1, wherein said step of displacing the conveying direction leading end portion and the conveying direction trailing end portion of the belt-shaped material comprises the steps of:

storing displacement amounts by which the conveying direction leading end portion and the conveying direction trailing end portion are respectively displaced in advance;

determining, on the basis of a predetermined conveying speed or an actual conveyed distance, a distance between the conveying direction leading end portion of the belt-shaped material and the pair of guide members and a distance between the conveying direction trailing end portion of the belt-shaped material and the pair of guide members; and smoothly displacing each of the triangular portions in the widthwise direction, by a corresponding one of the guide members, on the basis of the stored displacement amount and in consideration of the distance determined for the triangular portion.

7. A method of centering a belt-shaped material according to claim 6, wherein said step of displacement of each of the conveying direction leading end portion and the conveying direction trailing end portion of the belt material is caused by a magnetic attraction force of the corresponding one of the guide members.

8. A method of centering a belt-shaped material according to claim 7, wherein said step of displacement of each of the conveying direction leading end portion and the conveying direction trailing end portion of the belt material is caused by attraction of a widthwise direction end portion of each of the conveying direction leading end portion and the conveying direction trailing end portion by the corresponding one of the guide members and subsequent movement of the corresponding one of the guide members over a predetermined distance.

* * * * *